Oct. 22, 1940.   V. W. BREITENSTEIN   2,218,502
TEMPERATURE CONTROLLER
Filed Nov. 25, 1936   3 Sheets-Sheet 1
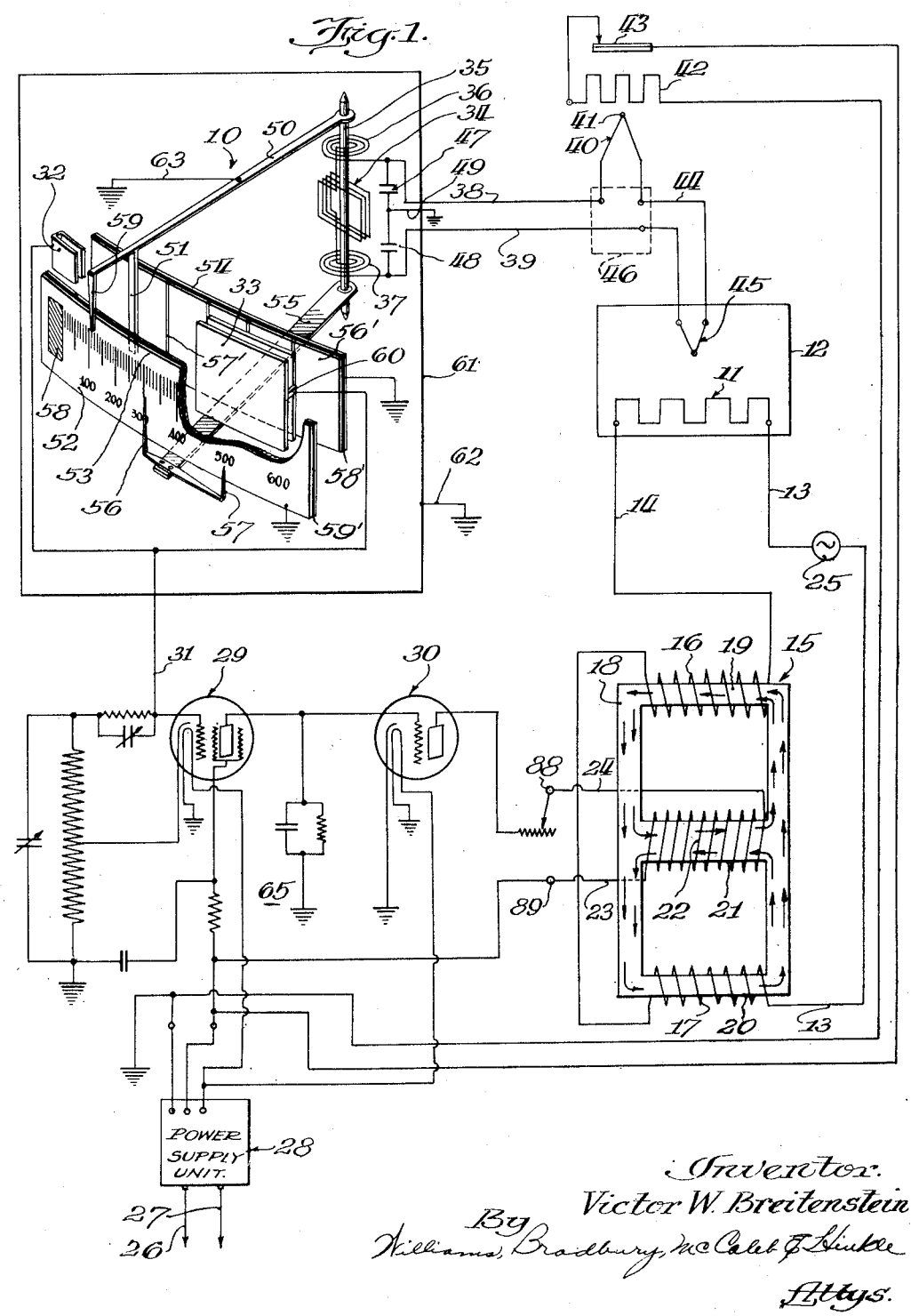
Inventor.
Victor W. Breitenstein
By Williams, Bradbury, McCaleb & Hinkle
Attys.

Oct. 22, 1940. V. W. BREITENSTEIN 2,218,502
TEMPERATURE CONTROLLER
Filed Nov. 25, 1936 3 Sheets-Sheet 2
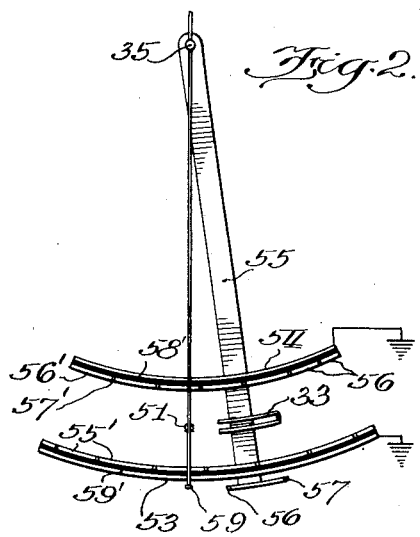
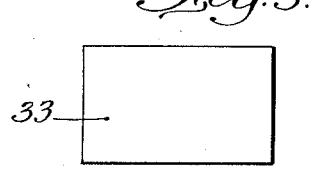
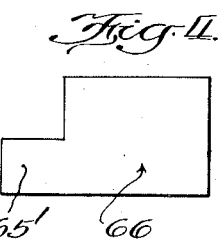
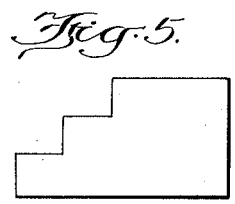
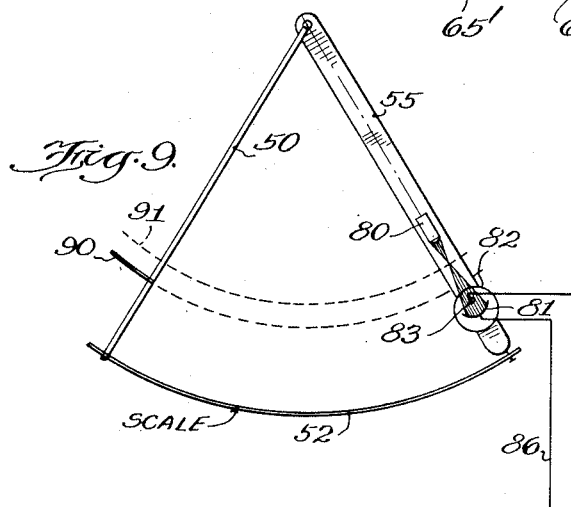
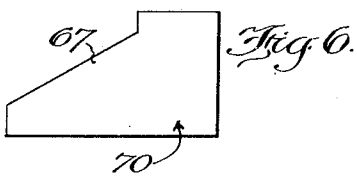
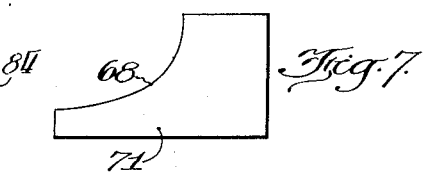
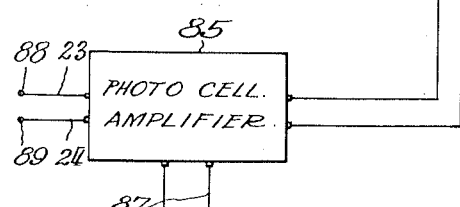
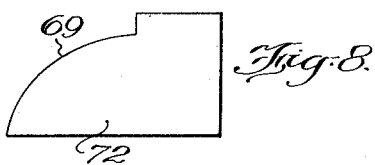
Inventor:
Victor W. Breitenstein
By Williams, Bradbury, McCaleb & Hinkle
Attys.

Oct. 22, 1940.   V. W. BREITENSTEIN   2,218,502
TEMPERATURE CONTROLLER
Filed Nov. 25, 1936    3 Sheets-Sheet 3
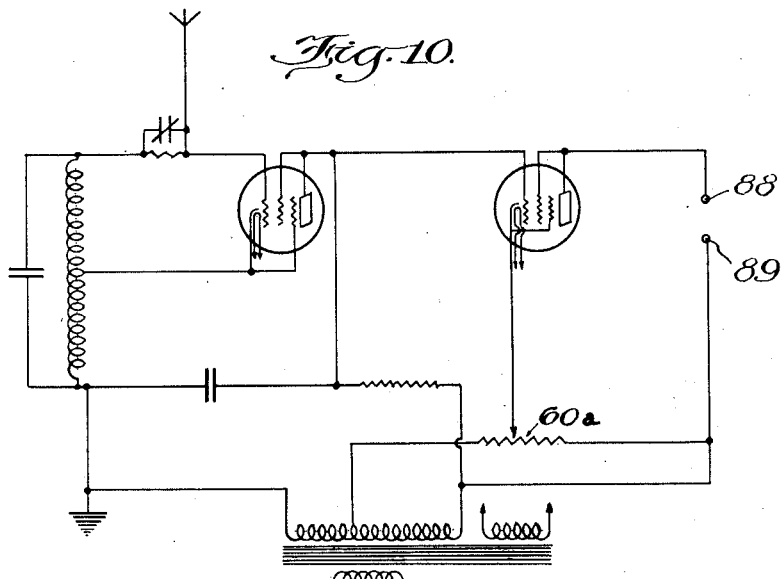
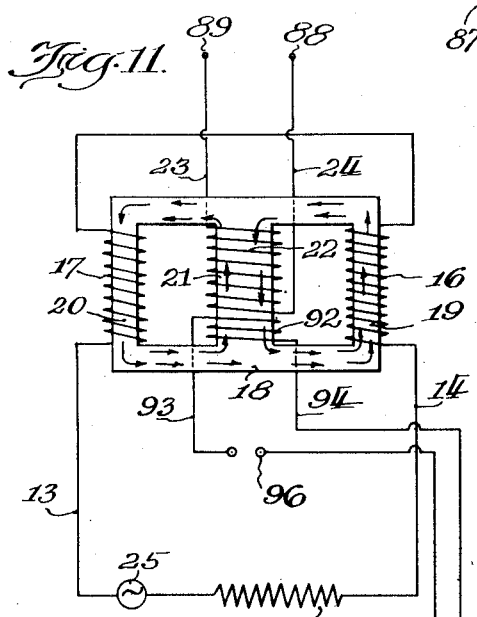
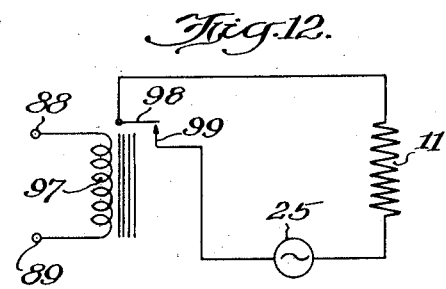
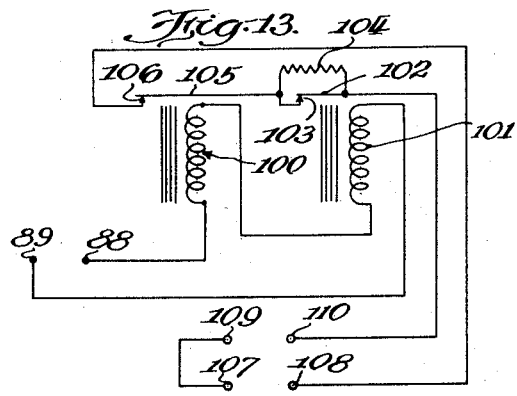
Inventor.
Victor W. Breitenstein
By Williams, Bradbury,
McCaleb & Hinkle Attys.

Patented Oct. 22, 1940

2,218,502

UNITED STATES PATENT OFFICE 2,218,502

TEMPERATURE CONTROLLER

Victor W. Breitenstein, Chicago, Ill., assignor to Illinois Testing Laboratories, Inc., Chicago, Ill., a corporation of Illinois Application November 25, 1936, Serial No. 112,644

10 Claims. (Cl. 236—69)

The present invention relates to temperature controllers, and is particularly concerned with temperature controlling devices which are adapted to be more safe, more sensitive, and more compact than the devices of the prior art.

One of the objects of the invention is the provision of an improved temperature controlling device having the safety feature that if any of the controlling circuits become deranged, the furnace or source of heat is automatically shut off and the condition of the circuit is indicated upon an indicating instrument included in the controller.

Another object of the invention is the provision of an improved temperature controller which is more sensitive than the devices of the prior art in that it is adapted to be actuated by relatively small changes of current which are caused by thermo-couples or other heat responsive devices, and whereby such relatively sensitive devices are adapted to control relatively heavy loads or large heating currents.

Another object of the invention is the provision of an improved temperature controller which does not require large and heavy switches, contacts, or circuit makers or breakers for the control of the load or current which effects the heating of an electric furnace or other similar device.

Another object is the provision of an improved controller of the type utilizing a moving coil electrical instrument movement having a reactance carried by its needle for cooperation with other relatively fixed reactance members to effect a control of an electronic circuit, which in turn is adapted to control a relatively large plate current without the necessity for actually making or breaking a circuit by mechanical means.

Another object of the invention is the provision of an improved controller of the class described, in which special arrangement has been made for relieving the instrument of the drag which is present in the devices of the prior art due to the proximity of the moving reactance member or condenser plate when it comes into the sphere of influence of the fixed reactance member or condenser plate.

In the devices of the prior art the charges which exist or accumulate on such condenser plates cause an attraction or repulsion between the movable and fixed plates as they approach each other, depending upon the character of the charge, and thereby cause the needle to be erratic in its movements. For example, as it approaches the fixed condenser plates, it may be drawn in between those plates more quickly, due to the action of the plates on the movable condenser plate carried by the needle. When the needle is being moved away from the fixed condenser plates, they may tend to hold it until a certain predetermined force is applied, thereafter releasing it quickly.

It is one of the objects of the present invention to provide means for the leaking off of any charge accumulating on the coils of the instrument so that this erratic action of the needle will be eliminated.

Another object of the invention is the provision of an instrument-movement-controlled device of the class described which is suitably shielded so that it is not affected by the proximity of other bodies having capacity, such as bodies of metal or the bodies of persons. Otherwise the controlling device might be actuated when any person or part of a person came close to the fixed condenser plates.

Another object of the invention is the provision of an improved temperature controlling device which is adapted to provide a graduated control according to any desired or predetermined curve, for controlling the flow of current to a heating element, without the necessity for dissipating energy in such control by means of resistance elements, and without the necessity for large and cumbersome circuit makers and breakers of a mechanical type.

Another object of the invention is the provision of an improved temperature controlling device so arranged and controlled by a thermocouple that if the thermo-couple circuit breaks, the heating current or load will be practically shut off or reduced to a low limit so as to prevent damage to the circuit.

Other objects and advantages of the invention will be apparent from the following description and the accompanying drawings, in which similar characters of reference indicate similar parts throughout the several views.

Referring to the three sheets of drawings accompanying this specification,

Fig. 1 is a diagrammatic view including a circuit diagram of a temperature controlling device constructed according to the present invention;

Fig. 2 is a diagram of a top plan view of a needle of an electrical instrument movement utilizing fixed and movable condenser plates for effecting a sensitive control in the foregoing device;

Fig. 3 is an elevational view showing the shape of the fixed condenser plates, which may be utilized in a device of the present type when it is merely desired to effect one condition of control, such as the turning on and off of power to a circuit;

Fig. 4 is a similar view of another fixed condenser plate which may be used where there are two conditions of control, such as the actuation of two different relays by the same controlling device;

Fig. 5 is a similar view, where three relays may be actuated by the same device;

Figs. 6, 7 and 8 are elevational views of fixed condenser plates which may be utilized with the complete circuit arrangement of Fig. 1 for effecting a graduated and continuous control of an electric heating circuit or other heating device by means of a core reactor, which may be supplemented by relays, if desired;

Fig. 9 is a diagrammatic plan view of a photocell arrangement which may be substituted for the condenser plate arrangement of Fig. 1 in the controller;

Fig. 10 is a wiring diagram of another amplifier electronic circuit, which may be substituted for the circuit of Fig. 1;

Fig. 11 is a diagrammatic view of a core reactor arrangement which may be substituted for that of Fig. 1;

Fig. 12 is another diagrammatic view of a relay controlling device which may be substituted for the core reactor of Fig. 1, or which may be controlled by the core reactor of Fig. 1;

Fig. 13 is another wiring diagram of a relay arrangement intended to be used with the core reactor and a controller having condenser plates of the type shown in Figs. 4 or 5.

The present application is a continuation in part of my prior application, Ser. No. 102,864, filed September 28, 1936, on Thermal controlling devices Patent No. 2,138,593, issued November 29, 1938.

Referring to Fig. 1, 10 indicates in its entirety the thermal controlling device, which in this example of the invention is used for controlling the heating circuit of the heater resistance 11 of an electric furnace 12. The heater 11 of the furnace has its terminals connected by suitable conductors 13 and 14 to the circuits or contacts of a controlling device 15, which may be constructed as shown in Fig. 1, or which may consist of one or more relays of the type shown in Fig. 13.

These electromagnetic relays may be connected in parallel, series, or in cascade. In the preferred embodiment of the invention the conductors 13 and 14 lead to the coils 16 and 17, which are located on the outer legs of a laminated reactance core 18, of the closed core type. The coils 16 and 17 may be connected in series or parallel, but are preferably so arranged that the magnetomotive force resulting from the flow of current in these coils tends to cause flux to flow in the direction indicated by the arrows located in the legs 19 and 20.

When connected in series, the current flowing through the coils 16 and 17 would naturally be the same, and when connected in parallel the coils may be of the same number of turns and resistance so the currents again will be equal.

The reactance core 18 is provided with a central leg 21, which is preferably twice the cross-sectional area of the legs 19 and 20, and this central leg is provided with a magnetizing coil 22, which has its terminals connected to the conductors 23 and 24 of the electronic circuit.

The principle of operation of the saturated core reactor is as follows: The reactor consists of a three legged, laminated core. The outer legs carry the A. C. windings, which are in series with the load, in this case the electric heater. These A. C. windings present a high reactive impedance to the passage of the load current on account of the high permeability of the core. The A. C. windings on the outer legs are so connected with respect to each other that the flux induced thereby in the center leg at any instant by the winding of one leg opposes the flux induced by the winding of the other leg so that there is no transformer action in the core of the center leg because the flux tends to cancel out.

The center leg carries a direct current coil. When the D. C. coil on the center leg is energized and the core is magnetized with direct current, the permeability of the core is effectively changed or decreased with respect to the additional flux produced by the A. C. windings. As the core reaches saturation, due to flux produced by the D. C. coils, the A. C. coils cannot produce as much flux as they could when the direct current was not flowing. The effective permeability of the core is decreased in proportion to the energization of the direct current coils, and this decrease in effective permeability decreases the reactive impedance in the A. C. circuit so that more current is fed into the heating unit.

By supplying enough D. C. current to the center coil to saturate the core completely, the reactive impedance in the A. C. coils will fall so low that the effect is the same as if no iron at all were present in the core, and a maximum alternating current will flow to the heating elements.

In this way it is possible to control large amounts of A. C. supply with the output of thermionic tubes in the order of milliamperes, without using mechanical devices such as relays, circuit makers or breakers, switches, etc., and the control takes place gradually or in infinitesimal steps. Thermionic tubes are able to control up to about 1 kilo volt ampere, and for heavier loads up to 50 kilo volt amperes one pair of medium sized grid control, gaseous rectifier tubes will effect the same control when used in the present invention. To secure a good control and saturation, the coils are designed with one and one-half times as many D. C. ampere turns as the number of A. C. ampere turns available.

Some current will always flow into the heater element when such a saturated core reactor is used, but this flow of current into the heater is very advantageous in the appplication of core reactors to temperature controllers. This current can be kept at such a level that it will take care of the constant heat losses of the furnace. A good proportion to effect this result is to have fifty percent of the A. C. current flowing with no direct current in the center leg windings. One-half of the normal full load heating current in the furnace gives only one-fourth of the normal amount of heat, due to the fact that the heating effect of the current increases as the square of the current, the resistance being constant. This amount of steady current in the furnace is still economical, and the desired temperature in the furnace can be controlled automatically and very effectively by varying the other increment of current, amounting to fifty percent of the full load current in the furnace.

The center leg of the core reactor may have two or more direct current coils, the larger one being fed by the output of the power tube, and the smaller one being connected in series with a small rheostat to an auxiliary direct current supply for manual control to adjust the control to the best point of operation for any given conditions. The same rheostat may obviously be used for a remote control of the core reactor, or auxiliary D. C. coils may be used on the center leg to effect a remote control. Such a core reactor arrangement for controlling the current in an electric furnace or other heating device is far more economical than any rheostat because of the heavy losses which occur in the resistance of the rheostat, and which increase as the square of the current and proportional to the resistance used at any time in the rheostat.

In addition to this, the core reactor varies the heater current gradually and uniformly, instead of proceeding step by step, and therefore any desired temperature may be attained between the limits of operation.

Referring to the lower left corner of Fig. 1, the conductors 26 and 27 lead to an ordinary 60 cycle 110 volt source of A. C. power supply, which may be the same generator 25. 28 indicates a suitable source for providing the electronic circuit with the required voltages and current. 29 indicates the oscillator tube, and 30 indicates a power tube, the grid of which is connected in the plate circuit of the oscillator tube 29. The grid of the oscillator tube 29 is connected by a conductor 31 to the fixed condenser plates 32, 33 of a controlling instrument.

This controlling instrument comprises an electrical instrument movement having a moving coil 34 which is mounted on a spindle 35 and connected through the usual springs 36 and 37 to conductors 38 and 39. The coil 34 and springs 36 are, of course, insulated from the spindle 35. The conductor 38 leads to one terminal of a thermo-couple 40, which is a reference thermo-couple, whose hot junction 41 is kept at a constant elevated temperature of about 150 to 250 degrees F. by means of a heating element 42 controlled by a thermostatic switch 43. The other terminal of thermo-couple 40 is connected by conductor 44 to the terminal of the main thermo-couple 45, and the opposite terminal of that thermo-couple is connected to conductor 39.

The cold junctures of both thermo-couples 40, 45 may be included in the same housing 46 so that they will always be kept at the same temperature. The reference junction box 46 may then be located anywhere between the instrument and the measuring thermo-couple 45.

The connections between the instrument and the reference junction may be copper leads, and the junction box 46 may be suitably located to keep the cost of the leads between the thermo-couple 45 and the junction box 46 low.

The conductor 38 is connected to one plate of a by-pass condenser 47, the opposite plate of which is connected by a conductor to the terminal of another by-pass condenser 48. The other plate of the by-pass condenser 48 is connected by a conductor to the conductor 39, and the mid point between the condensers 47, 48 is connected to ground by conductor 49.

The condensers 47, 48 by-pass any charge which has accumulated on the coil 34 to by-pass to ground, and they are particularly effective in discharging the high frequency charges from the coils 34. As a result of the action of these condensers, the needle 50, bearing the movable condenser plate 51, does not tend to be drawn toward the fixed condenser plates 32 or 33 when it comes into proximity with them. Neither does it have the drag or retaining force which tends to hold the movable condenser plate 51 adjacent the fixed condenser plates 32 and 33 when the needle is moving away from either of these points, as in the devices of the prior art.

The fixed condenser plates 32, 33 are preferably of sufficient length so that when the movable member 51 moves between them the needle may over-travel considerably without coming out from between the fixed condenser plates. This prevents the instrument from getting out of step with relays and from actuating relays or other controlling devices, due to over-travel of the needle.

The instrument 10 is preferably provided with a suitable scale 52, which may be mounted on a shield plate consisting of a curved metal plate 53, which like the other shield plate 54 is curved concentrically with respect to the movement of the movable condenser plate 51; that is, the shield plates 53, 54 are curved with respect to the spindle 35 as a center.

The fixed condenser plates 33 may be adjustably mounted on a movable arm 55, which pivots with respect to the spindle 35 to adjust the plates, but is held in fixed position and does not move with the needle 50.

The pivot for the arm 55 is located at the spindle 35 so that the plates 33 will move in the same circle as the movable condenser plate 51 mounted on the needle. Arm 55 may carry two limit pointers 56, 57, which indicate limits between which the needle 50 may move without getting out of the range of influence of the fixed plates 33. The scale 52 may also have a red field 58 at one end, indicating by means of the pointer end 59 when the condenser plate 51 has moved into the range of influence of the fixed plates 32; that is, when the actuating circuits, including conductors 38, 39, are on open circuit.

The arm 55 is preferably of insulating material, such as "Bakelite," and the plates 33 are provided with a stop 60, which limits the movement of the pointer 50 toward the right in Fig. 1 by engaging the movable condenser plate 51.

Referring to Fig. 2, it will be observed that the shields 53 and 54 support a plurality of condenser plates 55' and 56', which are spaced from each other by means of a saw cut 57' on each shield, and which are spaced from the shields and insulated therefrom by the insulating layers 58', 59'. The shields 53, 54 may then be grounded, and the condenser plates 55' or 56' will be in series with the ground, but the capacity of these plates will be greatly reduced because the resulting capacity of two condensers in series is always smaller than the smallest of them. This reduces the capacity relation between the controlling elements and the ground to a minimum, and the fixed condenser plates 33 are in constant capacity relation to the ground for every adjusted position.

These plates 33, being adjustable, they may be moved by means of the arm 55 to any predetermined position, to determine the point at which the heating circuit will be turned off and on again, although the finest adjustment of the circuit can be made by setting the potentiometer 60a of the plate circuit.

The casing 61 of the instrument is also grounded, as is the needle 50, by means of the conductors 62, 63.

While the drawing Fig. 1 shows a definite conductor 63 for grounding the needle, I prefer to omit this conductor and use the effective grounding for the needle which is provided by its proximity to the ground in the form of the grounded casing.

Referring to Figs. 3, 4 and 5, these show the shapes of the fixed condenser plates 33 for effecting a relay control of an electric heating circuit by means of relays, as shown in Fig. 13. When relays are employed, the conductors 23 and 24 lead to the coils of one or more relays 97, and the switch contacts of the relays control the supply of current to the conductors 13 and 14 leading to the heater element 11.

The characteristics of the electronic circuit, which is indicated in its entirety by the numeral 65, may be varied considerably within the scope of the present invention, by means of the values of the resistance included in the circuit. The electronic circuit may be made such that it operates at a relatively high frequency, and is sharply tuned so that the addition of the small amount of capacity represented by the movable condenser plate 51 throws the circuit out of tune and reduces the plate current in the power tube 30 to zero. In such case, when a condenser plate of the form shown in Fig. 3 is used as the fixed condenser plate, the circuit would be turned off when the movable condenser plate 51 moved into position adjacent the left or leading end of the fixed condenser plate 33. It would remain off as long as the movable condenser plate 51 was between the fixed condenser plates 33, being unaffected when the needle over-travels between the fixed condenser plates 33, and the circuit would only be turned on again when the heat in the furnace 12 had diminished to such an extent that the needle 50 moves the movable plate 51 out from between the plates 33.

The electronic circuit may also be arranged so that the addition of the amount of reactance represented by the movable condenser plate 51 to the electronic circuit merely changes the plate current in the power tube 30 by a fixed amount, which is sufficient to actuate a relay 97. In such case condenser plates of the forms shown in Figs. 4 or 5 may be used for the fixed condenser plates.

With such an oscillating circuit, the operation would be as follows: When the movable condenser plate 51 comes into position adjacent the narrow portion 65' of the fixed condenser plate 66, the first relay 101 would be actuated to shut off a portion of the heating element 11, which would be provided with a limiting resistance 104, as shown in Fig. 13; and when the movable condenser plate 51 moves over into position adjacent the wider part of the plate 66 the plate current of the power tube 30 would be changed sufficiently to actuate the second relay 100 to completely cut off the supply of power to the heating element 11. In some cases the major portion of the control might be effected by means of the relay 100.

Referring to Fig. 5, this is a form of fixed condenser plate which contemplates the use of three separate relays actuated by three successively larger values of current in the plate circuit of the power tube 30.

Referring to Figs. 6, 7 and 8, these are illustrations of different forms of fixed condenser plates, which are preferably used in connection with the core reactor controlling device 18.

When condenser plates of this type are used, it will be observed that the control curve for the heating element 11 may be made of any desired shape, the amount of current in the heating circuit being approximately proportional to the shape of the curve 67, 68, or 69 on the fixed condenser plates 70, 71 and 72.

The core reactor 18 may be used in connection with relays also of the type shown in Fig. 9 to effect the initial turning on and the final turning off of the current in the controlling circuits 13 and 14 of the heater 11, or auxiliary hand switches may be used to effect a complete shut-off of the circuit when the furnace is not being used.

In the latter case, while the furnace is in active use an amount of current would be flowing in the heater 11 equivalent to one-quarter full load, and additional current supplied to the heater 11 would be controlled by the core reactance member 18, as follows, with a suitable arrangement of electronic circuit 65 to operate under the following condition.

The electronic circuit 65 may then be arranged so that an increase of capacity in the circuit, represented by the proximity of the movable plate 51 to the fixed plates 33 or 32 will decrease the plate current of the power tube 30. In such case the oscillator 65 oscillates all the time while the furnace is in operation, as long as the movable plate 51 is spaced from the fixed condenser plates 32 or 33, and the temperature in the furnace is below the desired temperature.

The power tube 30 is a Class B amplifier, which has practically no plate current, without any signal input on the grid. Increased voltage from the oscillator to the power tube causes a high plate current in the power tube 30, which is sufficient in value, to saturate the core of the reactor 18. The impedance of the two outer windings 16 and 17, which are in series with the A. C. supply 25 to the heater load, will be at a minimum when the core 18 is saturated and maximum current will flow into the electric furnace.

As the temperature rises and the movable plate 51 moves toward the fixed plates 33, the capacity between these elements increases in proportion to the shape of the curves 67, 68 or 69. As this capacity increases, the output voltage of the oscillator decreases, and the plate current of the power tube decreases in substantially direct proportion. The saturating flux in the reactor 18 will then be diminished due to the decrease of the direct current in the plate circuit of the power tube 30, and the reactive impedance of the controlling coils 16 and 17 increases, thereby feeding less current to the heater 11 of the furnace.

This increase in capacity with the effects described may continue until maximum capacity exists between the stationary and movable plates; that is, when the movable plate 51 is adjacent the widest parts of either of the plates 70—72, at which point the increase in capacity is sufficient to stop the oscillator entirely from oscillation.

With no impressed voltage on the power tube 30, it will deliver a minimum direct current to the reactor which will result in a maximum reactive impedance in the circuit of the coils 16 and 17, and a minimum A. C. current is supplied to the furnace.

As stated above, this minimum current may be substantially one-fourth of the full load of the furnace, and it may be cut off entirely by means of auxiliary switches, when the furnace is not to be operated.

One of the most important features of the foregoing arrangement is that if the whole amplifier goes out of order and no direct current is fed to the coil 22 of the reactor, only a minimum A. C. current flows into the furnace, and so the furnace and the material in the furnace are protected against damage.

In case the oscillator gets out of order, with the power amplifier circuit intact, the same safety feature is present because the power circuit is adapted to reduce the heating current of the furnace to a minimum when there is no input to the grid of the power tube from the oscillator, and it is only the voltage from the oscillator which causes the power tube to energize the coils 16 and 17 so that more heating current flows in the furnace.

It will be evident to those skilled in the art that merely by changing the resistance and characteristics of the other elements of the oscillating circuit the oscillator may be made to operate in any of the predetermined manners described above, and I desire it to be understood that many different types of oscillating circuits may be used within the scope of the invention.

I desire it to be understood that instead of the movable and fixed condenser plates which constitute a capacitative reactance, I may also employ an inductive reactance in the form of fixed and movable inductance coils, or I may use fixed and movable bodies of paramagnetic material adapted to come into proximity with each other to change the reluctance of a magnetic circuit, or I may use a suitable light beam or beams instead of the reactance members acting on a light responsive member, with a shield replacing the movable condenser plate, or a mirror carried by the galvanometer for reflecting the light beam in a predetermined manner to accomplish the same result.

While the needle preferably carries the relatively small condenser plate 51 and the larger condenser plates 33 are preferably fixed, the reason for this is that the instrument movement should have a minimum amount of inertia; but in some embodiments of the invention the larger and differently shaped condenser plates may be mounted on the needle to cooperate with a relatively small and narrow fixed condenser plate.

Referring now to the arrangement including the thermo-couples 40 and 45, the thermo-couple 45 generates an electromotive force which acts on the moving coil 34 of the instrument 10, causing a flow of current in the moving coil, and resulting in a field which reacts with the field of the galvanometer that is caused by the permanent magnet or electromagnet of the instrument. This causes the needle 50 to move in a counter-clockwise direction in Fig. 1, indicating the elevated temperature of the furnace, and the heater 11 is thus controlled by a heat responsive or measuring thermo-couple 45.

The instrument movement is adjusted by means of a zero adjustment screw so that the pointer 50 comes to rest in the red field 58 under conditions of zero input or open circuit. The electromotive force of the reference couple 40 at its constant temperature is such that it brings the pointer to the prevailing temperature of the cold junction, as indicated on the scale 52, whereas the measuring thermo-couple 45 adds the necessary electromotive force for the difference between the cold junction and the hot junction of the measuring thermo-couple 31.

The thermo-couples are connected in such a way that the instrument will indicate the sum of their electromotive forces. Any break in the leads anywhere between the instrument, reference junction, and measuring junction, will open-circuit the instrument, which immediately returns the pointer to the red field 58 of Fig. 1, and indicates through its position the damaged thermo-couple leads.

In the case of an automatic controller, as described with respect to Fig. 1, the zero position may actuate a contact maker and breaker to shut off the power or the supply of fuel to the furnace by means of the fixed condenser plates 32. In case the copper leads between the thermo-couples and the instrument become short-circuited, the instrument also returns to zero position for lack of any electromotive force, and automatically indicates the damaged leads and shuts off the power or fuel to the furnace.

It should be understood that instead of an electrical heating resistance 11 and electrical circuit makers and breakers for controlling resistance 11, the furnace may be provided with a suitable oil burner or a gas burner, in which case the relays or current in the conductors 13 and 14 may control valves for controlling the supply of liquid or gaseous fuel and the circuit makers and breakers or pilot lights for effecting suitable ignition.

In other embodiments of the invention the furnace may be provided with solid fuel, such as coal, supplied constantly by a stoker, which is provided with any suitable kind of electrical control, except that in this case the fuel in the furnace is kept in a constant state of ignition, but its combustion is regulated by the supply of air with suitable thermally controlled fans and by the supply of fuel also thermally controlled by motors which may be actuated by current flowing in the conductors 13 and 14.

It will thus be observed that I have invented an improved temperature controlling device, which is adapted to effect a graduated control of an electric furnace in one embodiment of the invention, without the usual step-by-step control of the heating circuit.

The present controller is safe in its operation because the heating current is reduced to a minimum when the thermocouples are disabled, when the electronic circuit is disabled, or when the power circuit is disabled.

Referring to Fig. 9, this is a fragmentary diagrammatic view of a modification in which a photo-cell is employed instead of condenser plates. It may be substituted in the arrangement of Fig. 1, as follows: The arm 55 is the same adjustable arm of the instrument movement, and it is provided with a suitable pilot light 80, which may comprise an electric light bulb with a suitable housing and lens for directing the light on the electrode 81 of a photocell 82. The other electrode 83 of the photocell is connected by a conductor 84 to the terminal of the photocell amplifier 85, and the electrode 81 is connected by a conductor 86 to a terminal of the photocell amplifier.

This amplifier is to be energized from a 110 volt A. C. source, as indicated by the leads 87, and the amplifier output is connected to leads 23, 24, corresponding to the top terminals of the oscillating circuit 65 of Fig. 1.

The terminals 88, 89, indicated by the small circles in both Fig. 1 and Fig. 9, show where this amplifier is connected in the circuit when the photo-cell arrangement is used with a core reactor. It may, of course, be used also with the oscillator circuit of Fig. 10, or with the core reactor arrangement of Fig. 11, with the relay arrangement of Fig. 12, or the relay arrangement of Fig. 13.

The needle of the photocell arrangement is indicated by the same numeral 50, but instead of being provided with a condenser plate, it may be provided with a vane 90 or 91, adapted to intercept the rays of light from the pilot light to the photocell.

The vane 90 may be adjustably mounted on the pointer 50 so that it may be adjusted to the position 91, or the vane may be used in either of these positions. When it is used in the position of 91, it is adapted to intercept the rays of light from the pilot light at a point of focus, or in such a way that it immediately intercepts all of the light from the pilot light.

If desired, the arm 55 may be provided with a plurality of pilot lights 80, which are successively intercepted to actuate the relays of Figs. 12 or 13 in succession. When the vane is used as shown at point 90 in Fig. 9, it may progressively cut off the light from the pilot light and thus provide a graduated control by gradually varying the current in the circuits 84, 86 to the photo-cell amplifier.

Referring to Fig. 10, this is another wiring diagram of the preferred form of oscillating electronic circuit employed in the present control system. In this embodiment the antenna at the top corresponds to the condenser plates 32 or 33. The circuit is intended to be energized by raw 110 volt A. C. current supplied at the terminals 87. The potentiometer 60a, previously referred to in connection with Fig. 1, is used for adjusting the plate circuit. The terminals 88 and 89, shown at the right, are connected to the core reactor in the manner shown in Figs. 1 or 11, and of course this oscillating circuit may also be used with the photo-cell arrangement or with the relay arrangements of Figs. 12 and 13.

Referring to Fig. 11, this is a modified and preferred form of core reactor circuit, the terminals 88 and 89 again indicating how this circuit may be substituted for that of the core reactor in Fig. 1.

In this embodiment the conductors 23, 24 carry direct current to the coil 22 carried by the central leg 21 of the core reactor, while the conductors 13 and 14 again carry A. C. current from the A. C. generator 25 to the heater load 11 through the A. C. coils 16 and 17 located on the outer legs 19 and 20 of the core reactor.

The central leg 22 is also provided with an auxiliary coil 92, the leads 93, 94 from which are carried to a separate potentiometer 95, and through a source of direct current electromotive force 96. Thus, by means of the potentiometer 95 the current in the auxiliary coil 92 may be regulated, and the point of operation of the core reactor may be separately adjusted for any operating conditions by the potentiometer 95.

This potentiometer enables the user to regulate how much of the current of the load is to be controlled and how much of the current of the load is to be constant normal heating current.

Referring to Fig. 12, this shows a relay arrangement for controlling the load 11, the terminals 88 and 89 of which may be connected to the amplifier output. In this embodiment 25 indicates the source of alternating current for the load, and 97 the coils of the relay having the contacts 98, 99.

Referring to Fig. 13, this is another modified relay arrangement, in which the terminals 88, 89 may again be connected to the amplifier output, and two relays are used. The first relay, indicated by the numeral 100, has its coil in series with the second relay 101. The contacts 102, 103 of the second relay are bridged by a resistance 104, which may be of substantially the resistance of the relay coils 101, so that when the relay 101 opens its contacts 102, 103, the circuit may still be established through the relay 100 by means of its contacts 105, 106. The terminals 107, 108 may be connected to the direct current winding 22 on the reactor, while the terminals 109, 110 may be connected to a source of direct current.

It will thus be observed that the present controller is adapted to be used in a variety of different ways, either with relays or core reactors or both, and it may be embodied in a device having an instrument movement controlling condenser plates or controlling a photo-cell.

The present temperature controller is adapted to effect a control within closer limits than the devices of the prior art because of its more sensitive controlling devices, and at the same time it may be reduced to a very compact condition because of the lack of necessity of mechanical circuit makers and breakers for the final control of the heating current.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention what I claim as new and desire to secure by Letters Patent of the United States is:

1. In a controlling device, the combination of a thermo-couple with a movable coil electrical instrument movement adapted to be actuated thereby, a needle carried by said movement, a movable reactance member carried by said needle, a fixed reactance adapted to cooperate with said movable reactance when the needle moves to predetermined position, an electronic control circuit adapted to be affected by the proximity of said reactance members, and leakage means connected to the coil of said moving coil instrument and to ground for discharging accumulated charges on the moving coil of said instrument and minimizing the pull between said reactance members when they are located adjacent each other, said leakage means comprising a pair of series connected reactance members connected in parallel with the movable coil and a ground connection between said last-mentioned reactance members.

2. In a temperature controller, the combination of thermally responsive controlling means with a movable member adapted to be actuated thereby, said movable member carrying a reactance, a fixed reactance adapted to coact with said movable reactance, an electronic oscillating circuit in a state of constant oscillation during the operation of said device, the proximity of said reactance members being adapted to throw the circuit out of oscillation to effect a control of a controlled member, said controlled member comprising a heating device, a source of alternating current for actuating said heating device, a reactance coil for controlling the flow of alternating current, said reactance coil being mounted on a magnetic core, and means affected by said electronic circuit for controlling the permeability of said core.

3. In a controlling instrument, the combination of a moving coil electric galvanometer having a needle, with a reactance member carried by said needle, a fixed reactance member located adjacent the path of said movable reactance member, a pair of shield members located concentrically with respect to said reactance members, said needle being grounded and said shields being grounded to stabilize the capacity losses between the reactance members and ground.

4. In a controlling instrument, the combination of a moving coil electric galvanometer having a needle, with a reactance member carried by said needle, a fixed reactance member located adjacent the path of said movable reactance member, a pair of shield members located concentrically with respect to said reactance members, said needle being grounded and said shields being grounded to stabilize the capacity losses between the reactance members and ground, said shields being provided with an insulating layer separating each of said shields from a plurality of sectional condenser plates extending parallel to and secured to said shields, said condenser plates being of relatively small area to reduce the capacitative effect of said shields.

5. In a temperature controlling device, the combination of a movable member adapted to be moved responsive to changes in temperature and carrying a condenser plate, with a second fixed condenser plate adapted to cooperate with the first-mentioned condenser plate to affect an electronic control circuit, one of said condenser plates having its leading edge formed with a curve of predetermined shape whereby the capacity of said plates is varied by the movement of said plates with respect to each other, according to the shape of said curve.

6. In a temperature controlling device, the combination of a movable member adapted to be moved responsive to changes in temperature and carrying a condenser plate, with a second fixed condenser plate adapted to cooperate with the first-mentioned condenser plate to effect an electronic control circuit, one of said condenser plates having its leading edge formed with a curve of predetermined shape whereby the capacity of said plates is varied by the movement of said plates with respect to each other, according to the shape of said curve, a controlled heating element actuated by alternating current, a reactance coil in the circuit of said heating element, and means affected by the controlling current in said electronic control circuit to control the impedance of said reactance in the heating circuit, whereby the heating current is varied substantially according to said curve.

7. In a temperature controlling device, the combination of a movable member adapted to be moved responsive to changes in temperature and carrying a condenser plate, with a second fixed condenser plate adapted to cooperate with the first-mentioned condenser plate to affect an electronic control circuit, one of said condenser plates having its leading edge formed with a curve of predetermined shape whereby the capacity of said plates is varied by the movement of said plates with respect to each other, according to the shape of said curve, and an electronic control circuit connected to said plates in such manner that the affect of the additional capacity included in the circuit by the movement of said movable member varies the current in a controlling circuit of said electronic circuit substantially in direct proportion to the shape of said curve.

8. In a temperature controller, the combination of electrical means adapted to be actuated responsive to a change in temperature, with a core reactor having a direct current coil adapted to be controlled by said electrical means, alternating current coils on said core reactor having their effective impedance controlled by the amount of current in said direct current coil, and a plurality of relays combined with said core reactor for controlling a source of alternating current used for heating supply, whereby a double heating condition may be automatically imposed on the material subjected to the heat from the heating supply.

9. In a temperature controller, the combination of a measuring thermo-couple located to be subjected to the temperature to be controlled, with a reference thermo-couple in series with said thermo-couple, means for maintaining said reference thremo-couple at a constant temperature, a movable coil electrical instrument movement adapted to be actuated by impulses from said thermo-couples, a needle carried by said movement, and movable reactance member carried by said needle, a fixed reactance adapted to cooperate with said movable reactance when the needle moves to a predetermined position, an electrionic control circuit adapted to be affected by the proximity of said reactance members, said electrionic circuit being in a state of constant oscillation during the operation of said device, and the proximity of said reactance members being adapted to throw said circuit out of oscillation to effect a control of a controlled member, said electrionic circuit acting on a power tube whereby the plate current of the power tube is adapted to control the auxiliary electric circuit makers and breakers, a heating circuit controlled by said electrionic circuit, a source of alternating current for actuating said heating circuit, a reactance regulating device for controlling said heating circuit, comprising a reactance coil in circuit with the alternating current, a magnetic core and auxiliary coils on said magnetic core for controlling the permeability of said core, said auxiliary coils being energized by direct current from said power tube.

10. In a controlling device, the combination of a movable coil electrical instrument adapted to be actuated by direct current, a needle carried by said movement, a movable controlling member carried by said needle, electrical means arranged with respect to said needle and adapted to be controlled by the interposition of said movable member when carried by said needle, an amplifier connected to said electrical means for amplifying the electrical impulses received therefrom, said member being provided with a leading edge of predetermined shape for interception according to a predetermined rule, electrical heating means adapted to be controlled by said amplifier, and a plurality of relays interposed between said amplifier and said electric heating means for imposing a plurality of different heating conditions on said electric heating means, said movable member being adapted to control the heating means according to the characteristics desired for a specific installation.

VICTOR W. BREITENSTEIN.